Aug. 30, 1938.  O. E. ZAHN  2,128,872
MEAT TENDERIZING MACHINE
Filed Jan. 17, 1936  2 Sheets-Sheet 1
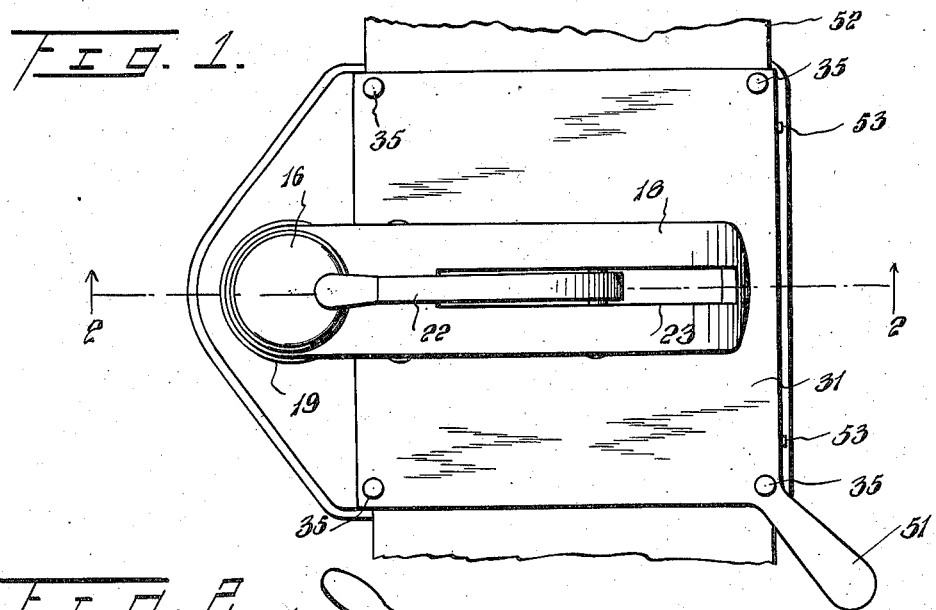
Fig. 1.
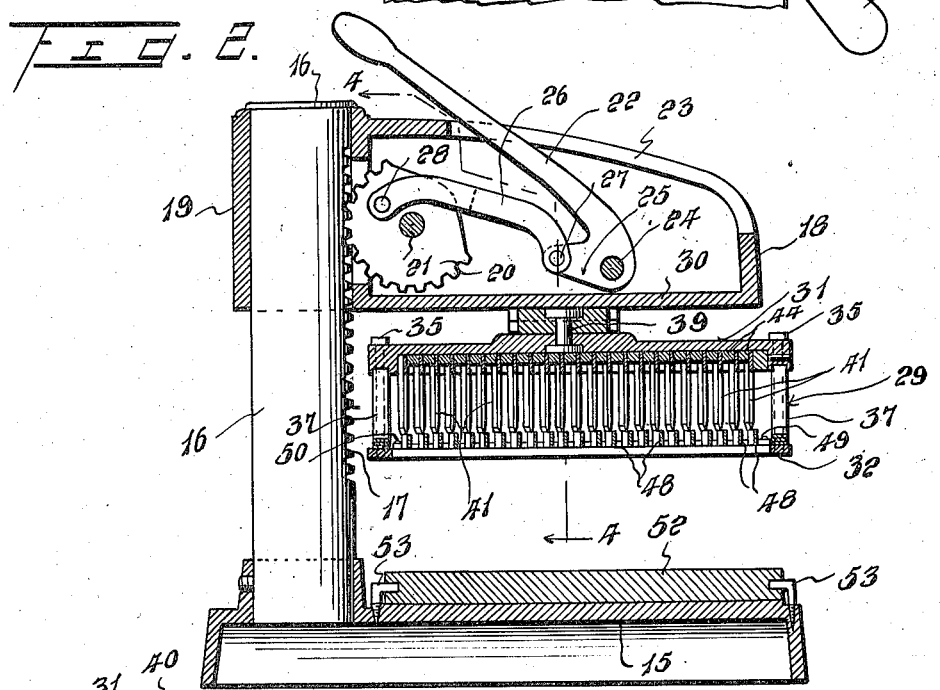
Fig. 2.
Fig. 3.
Inventor
Otto E. Zahn
By
Attorney.

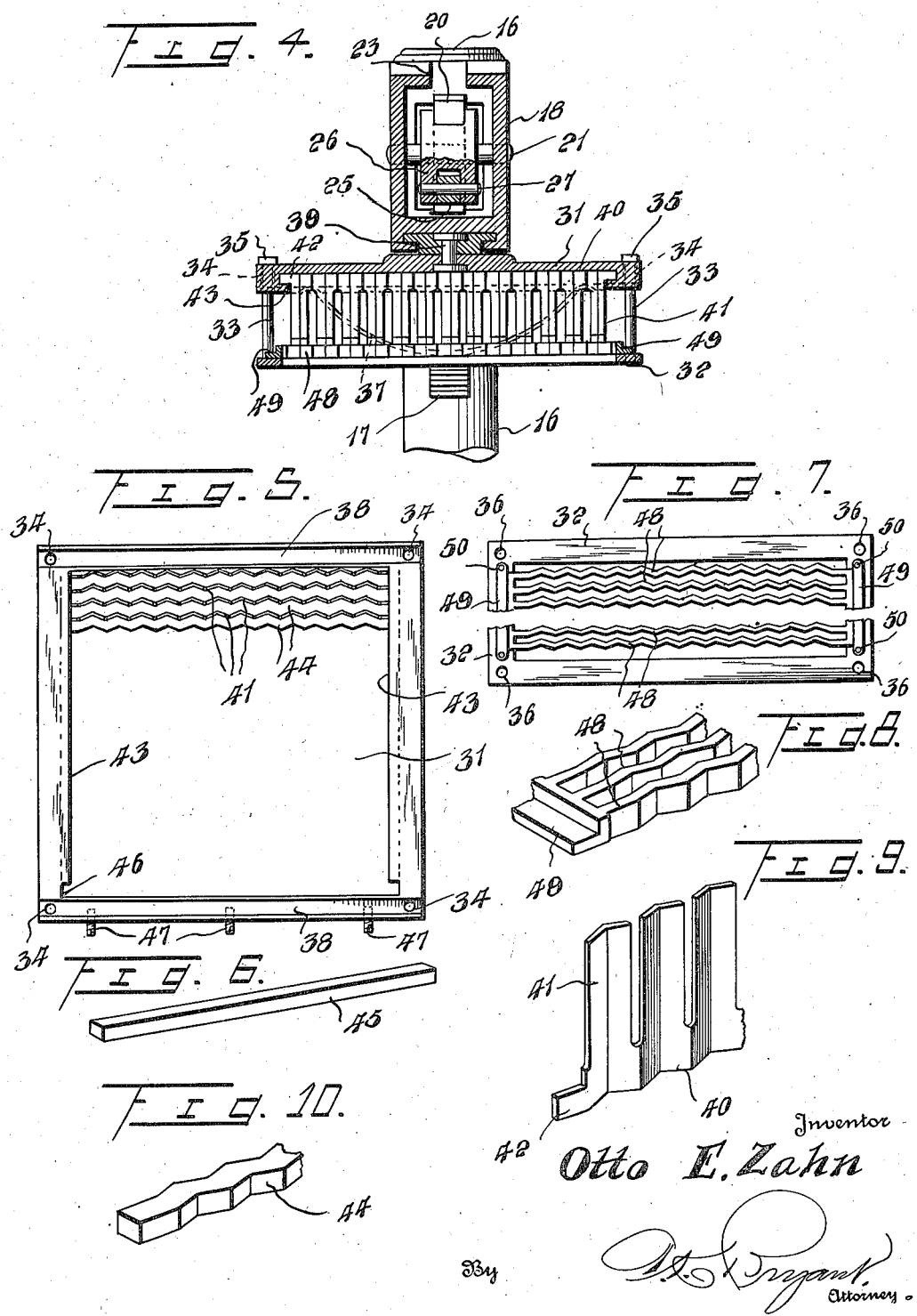
Aug. 30, 1938. O. E. ZAHN 2,128,872
MEAT TENDERIZING MACHINE
Filed Jan. 17, 1936 2 Sheets-Sheet 2

Patented Aug. 30, 1938

2,128,872

UNITED STATES PATENT OFFICE 2,128,872

MEAT-TENDERIZING MACHINE

Otto E. Zahn, West Bend, Wis.

Application January 17, 1936, Serial No. 59,624

3 Claims. (Cl. 17—25)

This invention relates to certain new and useful improvements in meat tenderizing machines.

The primary object of the invention is to provide a machine for tenderizing various cuts of meats, such as steaks and of the type that forms indentures or cuts in each side of the meat by means of cutter blades, preferably of corrugated form with strippers associated with the blades to effect complete separation of the blades from the cut meat.

A further object of the invention is to provide a meat tenderizing machine of the foregoing character and of the plunger or presser type embodying a manually operable vertically shiftable frame carrying cutting blades with strippers movable relative to the blades and constituting a guard for the cutting edges of the blades when the frame is elevated for the placement of a piece of meat on the cutting block.

A further and important object of the invention is to provide a meat tenderizing machine comprising a plurality of cutting blades and spacer bars therefor that may be easily and quickly assembled and disassembled for purposes of cleaning, sharpening or replacement of damaged parts.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a top plan view of a meat tenderizing machine constructed in accordance with the present invention;

Figure 2 is a vertical longitudinal sectional view taken on line 2—2 of Figure 1, showing the vertically shiftable frame carrying the cutting elements and the manually operable means therefor;

Figure 3 is a fragmentary detail sectional view of a portion of the cutting frame showing the cutter blades and strippers with leaf springs between the head and base of the cutter frame for normally positioning the strippers as guards for the cutting edges of the blades;

Figure 4 is a vertical sectional view taken on line 4—4 of Figure 2;

Figure 5 is a bottom plan view of the head of the cutter frame showing corrugated cutter blades and spacer bars therefor carried by the head;

Figure 6 is a perspective view of the end locking or retainer key for the cutter blades and spacer bars;

Figure 7 is a top plan view of the base of the cutter frame, partly broken away and illustrating the corrugated bars of the strippers;

Figure 8 is a fragmentary perspective view of the stripper;

Figure 9 is a fragmentary perspective view of a cutter blade; and

Figure 10 is a fragmentary perspective view of a spacer bar for the cutting blade.

Referring more in detail to the accompanying drawings, the meat tenderizing machine comprises a base plate or frame 15 that may be of any configuration desired, and is herein shown as being rectangular, with a cylindrical standard 16 rising from one end thereof that is provided with a line of rack teeth 17.

A housing 18 is vertically shiftable on the standard 16 by means of a tubular bearing 19 at one end thereof and said housing carrying a cutter frame equipped with cutting blades and strippers contains manually operable mechanism for effecting raising and lowering movement thereof. As shown more clearly in Figures 2 and 4, a segment pinion 20 is carried by a shaft 21 journalled transversely of the housing 18 with the pinion 20 having meshing engagement with the rack teeth 17 of the standard. A bell crank lever comprising a handle 22 that extends through a slotted opening 23 in the upper wall of the housing 18 is pivotally mounted within the housing as at 24, the other leg 25 of the bell crank lever having a link connection 26 with the segment pinion 20; one end of the link 26 is pivoted as at 27 to the leg 25 of the lever while the other end of the link is pivoted as at 28 to the pinion 20 and the link pivots 27 and 28 are so related to the pinion shaft 21 as to be off center relative thereto when the housing 18 is at its limit of upward movement to prevent accidental lowering movement of the housing.

The cutter frame 29 is suspended from the bottom wall 30 of the housing 18 and said frame comprises a head plate 31 of rectangular formation and a base rectangular bar frame 32 connected together by means of bolts 33 passed through corner openings 34 in the head plate 31 with the head 35 of the bolt 33 engaged with the upper side of the head plate while the lower ends of the bolts are threaded or otherwise anchored in the corner openings 36 in the bar frame 32. The head plate 31 and bar frame 32 are maintained in spaced relation by the leaf springs 37 having their intermediate portions resting on the frame 32 and their ends extending into grooves 38 at the underside of the head plate 31. The head plate 31 has a swivel connection 39 with the underside of the bottom wall 30 of the housing 18.

A plurality of cutter members and spacer bars are carried by the head plate 31 of the cutter frame 29, one of the cutter members being fragmentarily illustrated in Fig. 9 and comprising a corrugated backing 40 from which V-shaped blades 41 extend, a lug extension 42 at each end of the backing 40 being supported on a ledge 43 at the underside of the head plate 31 as shown in Figs. 4 and 5. A corrugated spacer bar 44 shown in detail in Fig. 10 is supported on the ledges 43 at its end and a spacer bar is positioned between adjacent blades as shown in Figs. 2, 3 and 5. An end locking bar or key 45 as shown in detail in Fig. 6 is engaged with one end cutter blade as shown in Figs. 2 and 3, the locking key bar 45 having its ends extending into the cut-outs 46 in corresponding ends of the ledges 43 and retained in position by the set screws 47. A stripper is associated with each cutter blade 41 and includes a plurality of corrugated stripper bars 48 arranged in spaced relation and connected at their ends to angle bars 49 as shown in detail in Fig. 8, the stripper bars 48 being secured to the upper face of the base bar frame 32 by having the angle bars 49 anchored as at 50 to opposite sides of the bar frame as shown in Fig. 7. As stated, a stripper bar 48 is associated with each series of cutter blades 41 as shown in Figs. 2 and 3 and being placed in proximity of the path of movement of the cutter blades 41, they merely function as strippers freeing the cutting blades from the meat being tendered. When the frame 29 is in its raised inoperative position as shown in Fig. 2, the stripper bars 48 are spaced slightly below the lower end of the cutter blades 41 to constitute a guard therefor. A handle 51 projects from one corner of the head plate 31 as shown in Fig. 1 and by which the cutter frame 29 may be moved on its swivel mounting 39 to vary the position of the cutter blades relative to the meat being tendered.

A cutter block 52 is mounted on the base frame 15 as shown in Fig. 1 and has opposite sides thereof grooved for slidable engagement with guides 53 to permit easy removal of the cutter block for cleaning purposes.

In the use of the machine, a piece of meat is placed upon the cutter block 52 and the leg handle 22 of the bell crank lever is moved through the slot 23 in the upper wall of the housing 18, this movement being communicated by the link 26 to the segment pinion 20 to effect lowering movement of the cutter frame 29. The base bar frame 32 moves into engagement with the cutter block 52 and continued downward movement of the frame causes the cutter blade 41 to descend between the stripper bars 48 for engagement with the meat to be tenderized. When the handle 22 is moved in the opposite direction to raise the cutter frame 29, the leaf springs 37 expand to separate the bar frame 32 and head plate 31 and cause the stripper bars 48 to separate the cutter blades 41 from the meat.

From the above detailed description of the invention, it is believed that the construction and operation thereof will at once be apparent, and while there is herein shown and described the preferred embodiment of the invention, it is nevertheless to be understood that minor changes may be made therein without departing from the spirit and scope of the invention as claimed.

I claim:—

1. In a meat tenderizing machine, a cutter block, a rectangular cutter frame vertically movable above the block, the cutter frame including relatively movable head and base members, the underside of the head having a pair of elongated grooves therein, respectively adjacent a pair of opposite sides of the head, a pair of leaf springs having their intermediate portions engaged with the base member of the cutter frame and the ends of each spring freely extending into one of said grooves vertically alined therewith for normally forcing the head and base members apart, cutter blades depending from the head member, cooperating blade strippers rising from the base member and normally spaced below the lower cutting edges of the cutter blades and constituting the lower extremity of the head for initial contact with the meat to be tenderized and for holding the meat on the block during upward removal of the blades from the meat, and manually operable means for raising and lowering the cutter frame.

2. In a meat tenderizing machine, a cutter block, a rectangular cutter frame vertically movable above the block, the cutter frame including relatively movable head and base members, the underside of the head having a pair of elongated grooves therein, respectively adjacent a pair of opposite sides of the head, a pair of leaf springs having their intermediate portions engaged with the base member of the cutter frame and the ends of each spring freely extending into one of said grooves vertically alined therewith for normally forcing the head and base members apart, cutter blades depending from the head member, cooperating blade strippers rising from the base member, and normally spaced below the lower cutting edges of the cutter blades and constituting the lower extremity of the head for initial contact with the meat to be tenderized and for holding the meat on the block during upward removal of the blades from the meat, manually operable means for raising and lowering the cutter frame, the cutter blades being of corrugated form, and corrugated spacer bars between the cutter blades.

3. In a meat tenderizing machine, a cutter block, a rectangular cutter frame vertically movable above the block and comprising head and base members, headed bolts passing through the head member and anchored to the base member, the underside of the head member having a pair of elongated grooves therein, respectively adjacent a pair of opposite sides of the head, a pair of leaf springs having their intermediate portions engaged with the base member of the cutter frame and the ends of each spring freely extending into one of said grooves vertically alined therewith for normally forcing the head and base members apart, cutter blades depending from the head member, blade strippers rising from the base member and normally spaced below the lower cutting edges of the cutter blades and constituting the lower extremity of the head for initial contact with the meat to be tenderized and for holding the meat on the block during upward removal of the blades from the meat, a housing carrying the cutter frame, a rack standard on which the housing is vertically slidable, and a lever-operated pinion in the housing engageable with the rock standard for raising and lowering the cutter frame relative to the cutter block.

OTTO E. ZAHN.